United States Patent
Chen et al.

(10) Patent No.: US 12,475,336 B1
(45) Date of Patent: Nov. 18, 2025

(54) POWERED NFC COMMUNICATION BOOSTER AND EXTENDER

(71) Applicant: Visa International Service Association, San Francisco, CA (US)

(72) Inventors: Yuexi Chen, Foster City, CA (US); Mustafa Top, San Ramon, CA (US)

(73) Assignee: Visa International Service Association, San Francisco, CA (US)

(*) Notice: Subject to any disclaimer, the term of this patent is extended or adjusted under 35 U.S.C. 154(b) by 0 days.

(21) Appl. No.: 18/777,307

(22) Filed: Jul. 18, 2024

(51) Int. Cl.
- *G06K 7/10* (2006.01)
- *H01Q 1/22* (2006.01)
- *H01Q 1/36* (2006.01)

(52) U.S. Cl.
CPC ..... *G06K 7/10297* (2013.01); *G06K 7/10316* (2013.01); *H01Q 1/2216* (2013.01); *H01Q 1/36* (2013.01)

(58) Field of Classification Search
CPC . G06K 7/1027; G06K 7/10316; H01Q 1/2216
USPC ........................................................ 235/451
See application file for complete search history.

(56) References Cited

U.S. PATENT DOCUMENTS

| | | |
|---|---|---|
| 9,608,327 B1 | 3/2017 | Tai et al. |
| 9,773,241 B2 | 9/2017 | Yang et al. |
| 2009/0203315 A1* | 8/2009 | Kawabata ........... H03F 3/45179 327/98 |
| 2014/0333253 A1* | 11/2014 | Suzuki .................... H01F 27/36 320/108 |
| 2017/0093191 A1* | 3/2017 | Arnold ................... H02J 7/0018 |
| 2017/0181650 A1* | 6/2017 | Bell, Jr. .................. A61B 5/053 |
| 2020/0235787 A1* | 7/2020 | Wurmfeld ............. H04B 5/263 |
| 2020/0251929 A1* | 8/2020 | Partovi .................. H01F 38/14 |
| 2020/0315307 A1* | 10/2020 | Foreman ................. H02J 7/02 |
| 2021/0036726 A1* | 2/2021 | Muehlmann ............ H04B 5/20 |
| 2023/0045879 A1* | 2/2023 | Tunnell ............. G06Q 30/0269 |
| 2023/0107933 A1* | 4/2023 | Huang .................... H04B 5/77 343/702 |
| 2024/0429476 A1* | 12/2024 | Akutsu ............. G01R 31/3648 |

FOREIGN PATENT DOCUMENTS

WO 2023104208 A1 6/2023

* cited by examiner

*Primary Examiner* — Allyson N Trail
(74) *Attorney, Agent, or Firm* — Kilpatrick Townsend & Stockton LLP (57) ABSTRACT

Embodiments provide for a method of allowing for communication between a portable device comprising a portable device NFC antenna and a user device comprising a user device NFC antenna using a bridge apparatus comprising a large coil, a small coil, and an amplifier circuit electrically coupling the large coil and the small coil. The method includes the small coil in the bridge apparatus receiving a near field communication (NFC) signal from the user device NFC antenna. The amplifying circuit can amplify the NFC signal to obtain an amplified NFC signal. The large coil in the bridge apparatus can transmit, to the portable device NFC antenna, the amplified NFC signal.

18 Claims, 6 Drawing Sheets

POWERED NFC COMMUNICATION BOOSTER AND EXTENDER

CROSS-REFERENCE TO RELATED APPLICATIONS

None.

BACKGROUND

User devices such as mobile phones can interact with portable devices such as access cards via NFC. However, the NFC antenna in a user device such as a commercial, off-the-shelf (COTs) mobile phone may be closest to its rear surface. This is because a typical commercial, off-the-shelf mobile phone can emulate the function of a contactless access card and can be tapped against an access device such as gate access device or POS terminal to conduct a transaction. In this situation, the rear facing NFC antenna in the user device is positioned so that it can optimally interact with a contactless access device with a front facing NFC antenna. The NFC antenna in the user device is also rear facing due to size and layout constraints of the user devices. For example, a user device can include a touch screens that covers approximately 80%~100% of the front facing area.

However, a rear facing NFC antenna is not optimal if a user wishes to use the commercial, off-the-shelf mobile phone as a contactless access device. If the user device is being used as a contactless access device, the user would want to tap an access card to the front of the mobile phone to interact with it. Since the NFC antenna in a user device is rear facing, it emits an RF signal in an opposite direction to the direction that a screen is facing the user device (i.e., toward a rear face of the user device). This is different than a traditional contactless access device, which the NFC antenna emits an RF signal in the same direction that the screen is facing (i.e., toward a front face of the access device).

Further, in the user device, the NFC antenna's power emission and signal strength are much weaker than traditional access devices due to user device constraints (e.g., user devices are smaller and have more antennas than traditional access devices) and battery consumption constraints (e.g., 2-3 mA utilized by a smartphone as compared to 350 mA utilized by a point of sale device).

It would be desirable to provide improve the interaction between a user device such as a commercial, off-the-shelf mobile phone and a portable device such as a contactless access card (e.g., a contactless payment card), without making significant changes to the user device or the portable device.

Embodiments of the disclosure address this problem and other problems individually and collectively.

SUMMARY

One embodiment is related to a method of allowing for communication between a portable device comprising a portable device NFC antenna and a user device comprising a user device NFC antenna using a bridge apparatus comprising a large coil, a small coil, and an amplifier circuit electrically coupling the large coil and the small coil, the method comprising: receiving, by the small coil in the bridge apparatus from the user device NFC antenna, a near field communication (NFC) signal; amplifying, by the amplifying circuit, the NFC signal to obtain an amplified NFC signal; and transmitting, by the large coil in the bridge apparatus to the portable device NFC antenna, the amplified NFC signal.

Another embodiment is related to a bridge apparatus allowing for allowing communication between a portable device comprising a portable device NFC antenna and a user device comprising a user device NFC antenna, the bridge apparatus comprising: a large coil; a small coil; an amplifier circuit electrically coupling the large coil and the small coil; and a power source connection for supplying power to the amplifier circuit.

Another embodiment is related to a system comprising: a portable device a portable device NFC antenna; a user device comprising a user device NFC antenna; and a bridge apparatus configured to allowing communication between the portable device NFC antenna and user device NFC antenna, the bridge apparatus comprising a large coil, a small coil, and an amplifier circuit electrically coupling the large coil and the small coil; and a power source supplying power to the amplifier circuit.

Further details regarding embodiments of the disclosure can be found in the Detailed Description and the Figures.

DETAILED DESCRIPTION

Prior to discussing embodiments of the disclosure, some terms can be described in further detail.

A "user" may include an individual. In some embodiments, a user may be associated with one or more personal accounts and/or mobile devices. The user may also be referred to as a cardholder, account holder, or consumer in some embodiments.

A "user device" may be any suitable device that is operated by a user. Suitable user devices can communicate with external entities such as portable devices and remote server computers. Examples of user devices include mobile phones, laptop computers, desktop computers, server computers, vehicles such as automobiles, household appliances, wearable devices such as smart watches and fitness bands, etc.

An "interaction" may include a reciprocal action or influence. An interaction can include a communication, contact, or exchange between parties, devices, and/or entities. Example interactions include a transaction between two parties and a data exchange between two devices. In some embodiments, an interaction can include a user requesting access to secure data, a secure webpage, a secure location, and the like. In other embodiments, an interaction can include a payment transaction in which two devices can interact to facilitate a payment.

"Interaction data" can include data related to and/or recorded during an interaction. In some embodiments, interaction data can be transaction data of the network data. Transaction data can comprise a plurality of data elements with data values.

A "resource provider" may be an entity that can provide a resource such as goods, services, information, and/or access. Examples of resource providers includes merchants, data providers, transit agencies, governmental entities, venue and dwelling operators, etc.

A "portable device" can be a device that is easily transportable. In some cases, it can be hand-held and compact. For example, a portable device may fit into a user's wallet and/or pocket (e.g., pocket-sized). Some exemplary portable devices may include smart cards, ordinary credit or debit cards (with a magnetic strip), keychain devices, etc. Other examples of portable devices include cellular phones, personal digital assistants (PDAs), pagers, payment cards, security cards, access cards, smart media, transponders, vehicles (e.g., cars, boats, motorcycles, etc.), wearable devices (e.g., smart watch, smart jewelry, smart clothing, etc.) and the like. The portable devices can also be debit devices (e.g., a debit card), credit devices (e.g., a credit card), or stored value devices (e.g., a stored value card).

A "near-field communication antenna" can include a device used to transmit and/or receive near-field communication based signals. A near-field communication antenna can be a chip or a chipset that enables short-range wireless communication between two devices. A near-field communication antenna can be a near-field communication reader chip (e.g., active component) or a near-field communication tag (e.g., passive component). A near-field communication antenna that is a near-field communication reader chip can provide power and can send near-field communication commands to a near-field communication tag. Near-field communication is based on inductive coupling between two antennas present on two devices (e.g., on a user device and on an access device). The two devices can communicate in one or both directions, using a frequency of 13.56 MHz in the globally available unlicensed radio frequency ISM band using the ISO/IEC 14443 air interface standard at data rates ranging from 106 to 848 kbit/s.

"Modulation" can include alteration of the amplitude or the frequency of an electromagnetic wave or other oscillation in accordance with the variations of a second signal. Modulation can be the process of varying one or more properties of a periodic waveform, called the carrier signal, with a separate signal called the modulation signal that typically contains information to be transmitted. The carrier signal can be demodulated to extract the information bearing modulation signal.

A "processor" may include a device that processes something. In some embodiments, a processor can include any suitable data computation device or devices. A processor may comprise one or more microprocessors working together to accomplish a desired function. The processor may include a CPU comprising at least one high-speed data processor adequate to execute program components for executing user and/or system-generated requests. The CPU may be a microprocessor such as AMD's Athlon, Duron and/or Opteron; IBM and/or Motorola's PowerPC; IBM's and Sony's Cell processor; Intel's Celeron, Itanium, Pentium, Xeon, and/or XScale; and/or the like processor(s).

A "memory" may be any suitable device or devices that can store electronic data. A suitable memory may comprise a non-transitory computer readable medium that stores instructions that can be executed by a processor to implement a desired method. Examples of memories may comprise one or more memory chips, disk drives, etc. Such memories may operate using any suitable electrical, optical, and/or magnetic mode of operation.

A "server computer" may include a powerful computer or cluster of computers. For example, the server computer can be a large mainframe, a minicomputer cluster, or a group of servers functioning as a unit. In one example, the server computer may be a database server coupled to a Web server. The server computer may comprise one or more computational apparatuses and may use any of a variety of computing structures, arrangements, and compilations for servicing the requests from one or more client computers.

Near field communication (NFC) is a short-range two way wireless communication technology that uses magnetic-field induction to enable communications between electronic devices in close proximity. An NFC-capable device is configured with a coil-loop antenna, through which an electric current is passed to generate a magnetic field that surrounds the conductor forming the coil-loop. A change in the magnetic field in the vicinity of the antenna induces a change in voltage across the terminals of the coil-loop, and a change in voltage across the terminals of the coil-loop changes the magnetic field generated by the antenna. By modulating the magnetic field generated between the inductively coupled coil-loop antennas, data is transferred between devices that have the antennas.

To operate properly, an NFC antenna in a user device that is in active mode (e.g., power generating) needs to be within a few centimeters of an NFC antenna in a portable device that works in passive mode. If two NFC antennas are too far away from each other, the field strength will be weak. If the field strength is too weak, then the portable device's energy requirement will not be met. As such, the portable device and the user device will not operate and will not be able to communicate via NFC.

As explained above, current user devices include rear facing NFC antennas that transmit low power signals out of their back surfaces. To achieve the best interaction between a portable device with an NFC antenna and a user device with an NFC antenna, the user needs to place the portable device on the back surface of the user device. This is awkward and inconvenient since the natural tendency of the user is to tap their portable device against the front face of the user device.

Embodiments of the invention solve the technical problem of ensuring that a strong NFC field is present between a portable device and a user device, even when the user device has an NFC antenna proximate its rear surface. Embodiments of the invention can allow a user to interact their portable device with the user device while the user is facing the front surface of the user device. As such, the user can see the screen on the front of the user device while using their the portable device to interact with the user device.

Embodiments of the disclosure provide for a powered near field communication (NFC) booster and extender (NFC B-E) in a bridge apparatus to amplify an NFC signal from a user device to a portable device and provide portable device modulation responses to the user device. The configuration of the bridge apparatus can extend NFC antenna communications from the user device's rear facing location to a front facing location.

The bridge apparatus can include two NFC antennas and an analog amplifier circuit to reposition the NFC reader location of a user device within an optimal reading range for a portable device.

The bridge apparatus can be proximate to the user device in use. The user device can include a rear facing NFC antenna that can be aligned with a first NFC antenna of the bridge apparatus. A second NFC antenna of the bridge apparatus can face in the same direction as the first NFC antenna. The first NFC antenna, the second NFC antenna, and the screen and input devices of the user device can all face forward in the same direction, when in use. The bridge apparatus can extend laterally beyond the user device such that the second NFC antenna faces in the same direction as the first NFC antenna, and the user device does not overlap the second NFC antenna. The second NFC antenna is accessible by the portable device since the user device does not cover it.

During use, the user can bring the portable device near the second NFC antenna in the bridge apparatus. For example, the portable device is tapped onto the landing plane of the bridge apparatus, which can correspond to the location of the second NFC antenna.

The user device's rear facing NFC antenna can detect the portable device via the bridge apparatus. The portable device itself may not be a battery powered device and can obtain energy from the NFC signals from the user device via the bridge apparatus. After the user device detects the portable device, it can generate an interaction message (e.g., an APDU command). The user device can encode the interaction message (which can be a digital signal) to form an encoded signal using a modified Miller coding and/or Manchester coding in accordance with NFC standards. The user device can then modulate the encoded signal onto a radio frequency (RF) carrier signal of 13.56 MHz to form a modulated interaction signal. The user device then transmits the modulated interaction signal using the user device's rear facing NFC antenna to the first NFC antenna in the bridge apparatus.

The modulated interaction signal can be provided from the first NFC antenna to an amplifier circuit in the bridge apparatus. The amplifier circuit amplifies the modulated interaction signal and provides the amplified modulated interaction signal to the second NFC antenna. The second NFC antenna then provides the amplified modulated interaction signal to the portable device via an NFC antenna in the portable device.

After receiving the amplified modulated interaction signal, the portable device can demodulate the amplified modulated interaction signal to obtain the encoded signal. The portable device can decode the encoded signal to obtain the interaction message. The portable device can then process the received interaction message. In some embodiments, the portable device can generate an interaction response message (e.g., an APDU response message). The portable device can then encode and modulate the interaction response message to form a modulated interaction response signal. The portable device can then provide the modulated interaction response signal to the second NFC antenna in the bridge apparatus using the NFC antenna in the portable device.

The bridge apparatus can then receive the modulated interaction response signal via the second NFC antenna. The bridge apparatus can then provide the modulated interaction response signal from the second NFC antenna to the first NFC antenna. The first NFC antenna can provide the modulated interaction response signal to the NFC antenna of the user device.

The user device can demodulate and decode the modulated interaction response signal to obtain the interaction response message. The user device can then process the interaction response message for the interaction between the user device and the portable device. This process can be repeated for other interaction request messages and other interaction response messages while the portable device is proximate to the bridge apparatus.

Figure 1:
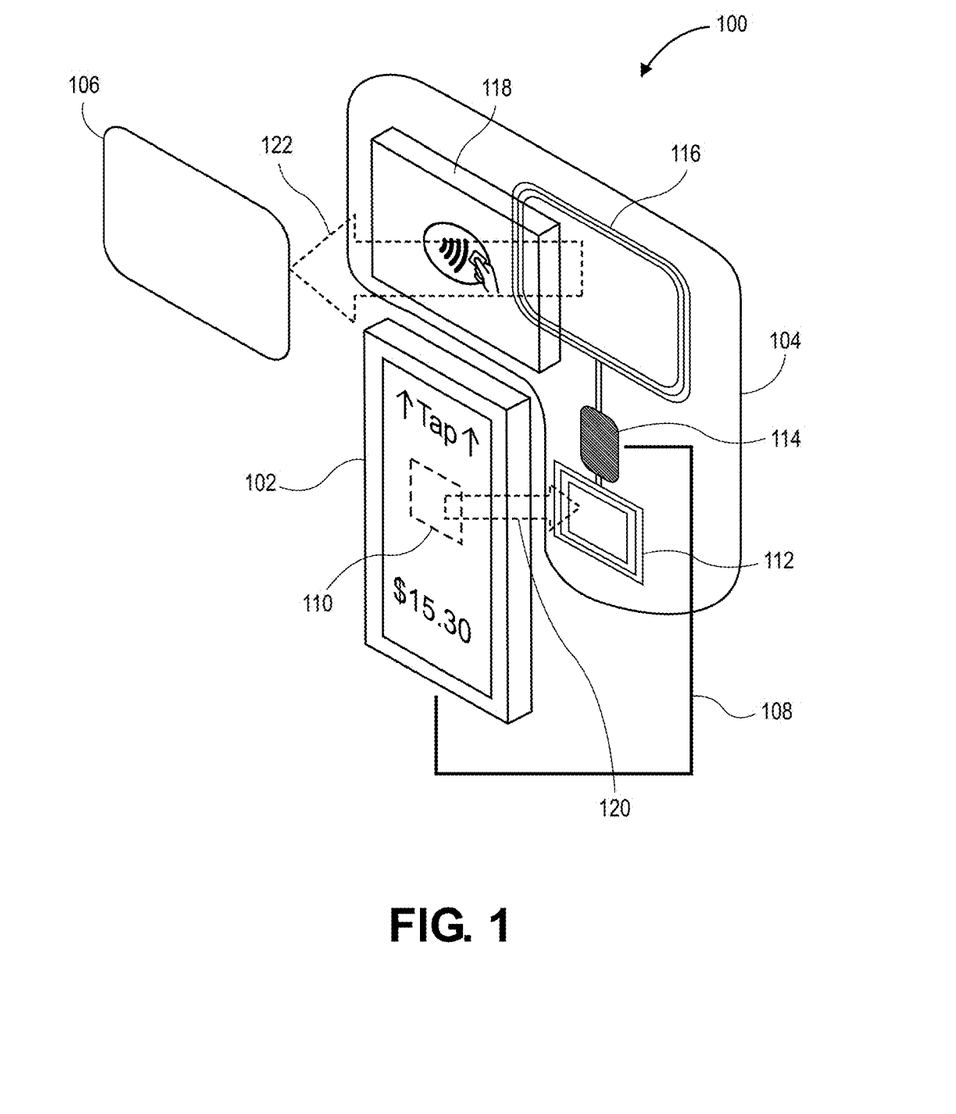
FIG. 1 shows a diagram illustrating a near field communication system according to embodiments.

FIG. 1 shows a system 100 according to embodiments of the disclosure. The system 100 comprises a user device 102, a bridge apparatus 104, a portable device 106, and a power supply cable 108. The bridge apparatus 104 can be in operative communication with the user device 102 and the portable device 106. The power supply cable 108 can supply power from the user device 102 to the amplifier circuit 114 in the bridge apparatus 104.

For simplicity of illustration, a certain number of components are shown in FIG. 1. It is understood, however, that embodiments of the invention may include more than one of each component. In addition, some embodiments of the invention may include fewer than or greater than all of the components shown in FIG. 1.

In some embodiments, the user device 102 can be a smartphone. The user device 102 can be operated by a resource provider that provides resources, or it could be operated by the user of the portable device 106. The front surface of the user device 102 can include a touch screen, and the user device 102 can include a user device NFC antenna 110. In this example, the user device NFC antenna 110 can be a rear facing NFC antenna that transmits signals out of the back surface of the user device 102.

The bridge apparatus 104 comprises a small coil 112, an amplifier circuit 114, and a large coil 116. The components of the bridge apparatus 104 can be embedded in a substrate. The bridge apparatus 104 can receive and transmit NFC signals to and from the user device 102 and the portable device 106.

The small coil 112 can be first NFC antenna and can be an inductor configured to create magnetic fields. The small coil 112 can operate at a frequency of approximately 13.56 MHz. The small coil 112 can have any suitable configuration, including a circular, ovular, rectangular, etc. shape, and can have dimensions suitable for interacting with the user device NFC antenna. In some embodiments, the small coil 112 can be about 1 inch to about 2.5 inches in diameter. As another example, the small coil 112 can be rectangular and can be about 1 inch by 1.5 inches. The small coil 112 can have a maximum dimension of about 2.5 inches.

The large coil 116 can be a second NFC coil, and can be an inductor configured to create magnetic fields. The large coil 116 can operate at a frequency of approximately 13.56 MHz. The large coil 116 can have any suitable configuration, including a circular, ovular, rectangular, etc. shape, and can have dimensions suitable for interacting with the user device NFC antenna. For example, the large coil 116 can be larger than the small coil 112. As an example, the large coil 116 can be about 2 inches to about 3 inches in diameter. The large coil 116 can also be between about 3 inches and 5 inches in diameter. As another example, the large coil 116 can be rectangular in shape and have dimensions of about 2.5 inches by 3 inches. In some embodiments, the large coil 116 can have a maximum dimension of about 5 inches.

The amplifier circuit 114 can be electrically coupled to the small coil 112 and the large coil 116. The amplifier circuit 114 can amplify signals passing between the small coil 112 and the large coil 116. For example, the amplifier circuit 114 can amplify modulated NFC signals received from the user device 102 via the small coil 112 before they pass to the large coil 116 and then to the user device NFC antenna in the portable device 106.

The amplifier circuit 114 can be a radio frequency (RF) amplifier circuit. The amplifier circuit 114 can amplify modulated frequency band signals to the required power level while ensuring minimal interference with adjacent channels. The amplifier circuit 114 can utilize power obtained from the power supply cable 108 to amplify signals.

In some embodiments, the bridge apparatus 104 can include a cover element 118. The cover element 118 can be integral to a housing that encompasses the small coil 112, the amplifier circuit 114, and the large coil 116 of the bridge apparatus 104. The cover element 118 can correspond to a landing plane upon which the portable device 106 is to be tapped during an interaction such that the portable device 106 is proximate to the large coil 116. Instructions for tapping the portable device 106 can be printed on the cover element 118. For example, an NFC logo can be printed on the cover element 118.

The housing (not shown) of the bridge apparatus 104 can be in any suitable form. In some embodiments, the bridge apparatus may resemble a phone case, with the cover element extending from a top surface of the user device 102. In other embodiments, the bridge apparatus 104 can be a planar structure (e.g., similar to a mousepad) upon which the user device 102 can lie while in use.

The bridge apparatus 104 can be positioned behind the user device, such that the small coil 112 overlaps and is proximate to the user device NFC antenna 110 near the back surface of the user device 102. The large coil 116 can be above the user device 102 and does not overlap with the back surface of the user device 102 or the user device in general. Because of this, the large coil 116 can be accessible by the portable device NFC antenna in the portable device 106 and large coil 116 and the portable device antenna can communicate with each other.

The portable device 106 can be in the form of a card that includes an NFC antenna. The portable device 106 can be a card such as a driver's license, a debit card, a credit card, an employee badge, etc. The portable device 106 can receive NFC signals from the large coil 116 via the portable device NFC antenna. The portable device 106 can transmit NFC signals to the large coil 116 via the portable device NFC antenna (not shown).

The power supply cable 108 can include electrical components capable of transferring electricity from a first end of the power supply cable 108 to a second end of the power supply cable 108. The power supply cable 108 can provide power to the bridge apparatus 104. The power supply cable 108 can electrically couple the bridge apparatus 104 and the user device 102. The power supply cable 108 can obtain power from a power supply in the user device 102. In some embodiments, the power supply cable 108 may not be connected to the user device 102 and can rather be connected to an external power supply (e.g. a battery pack, etc.). The power supply cable 108 can provide a 3.3 V, 5 V, 9 V, 15 V, 20 V, etc. voltage supply. As another example, the power supply cable 108 can provide 900 mA and 4.5 W.

FIG. 1 further illustrates a low power modulated NFC signal 120 and a high power modulated NFC signal 122. The low power modulated NFC signal 120 can be transmitted by the user device NFC antenna 110 and received by the small coil 112. The amplifier circuit 114 can amplify the low power modulated NFC signal 120 to form the high power modulated NFC signal 122. The high power modulated NFC signal 122 can be transmitted by the large coil 116 to an NFC antenna in the portable device 106.

Figure 2:
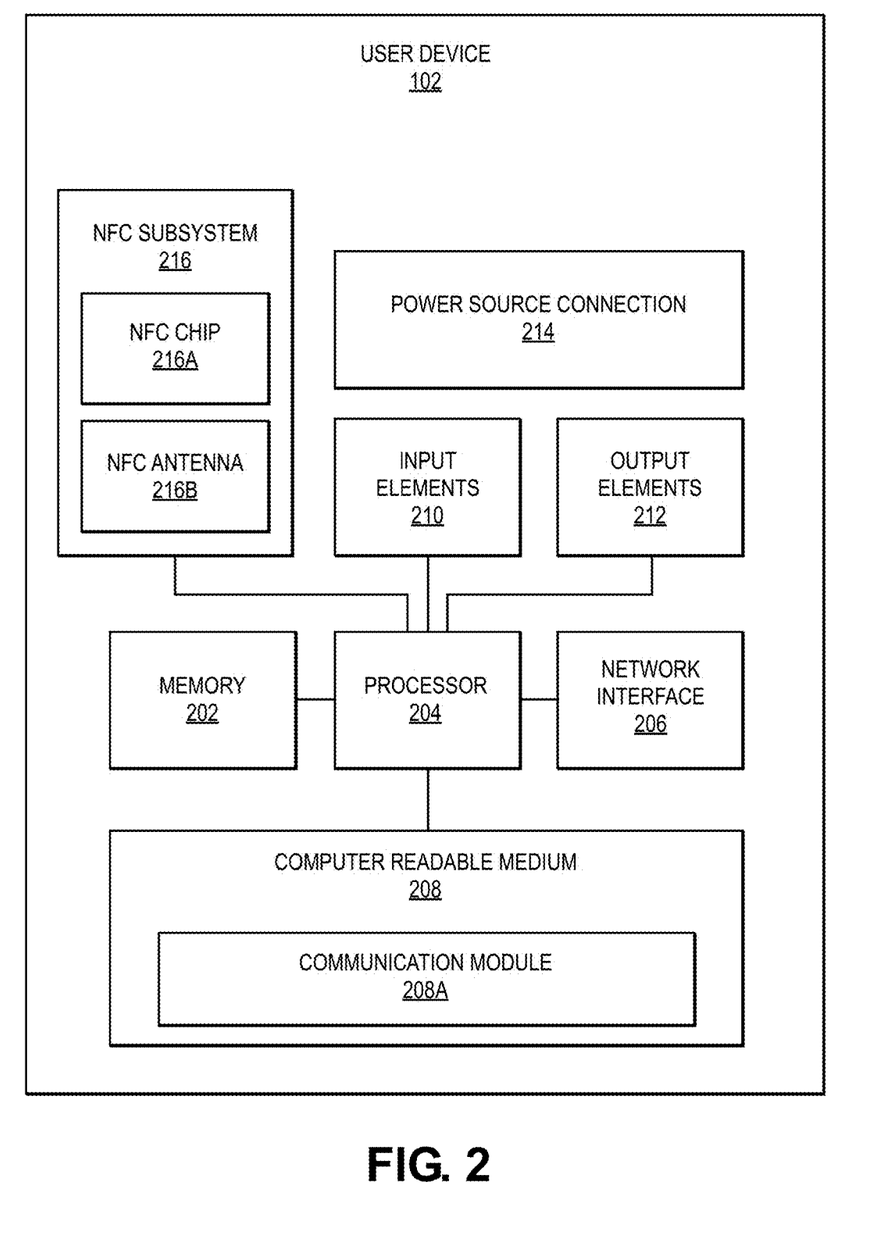
FIG. 2 shows a block diagram of components of a user device according to embodiments.

FIG. 2 shows a block diagram of the user device 102 according to embodiments. The exemplary user device 102 may comprise a processor 204. The processor 204 may be coupled to a memory 202, a network interface 206, a computer readable medium 208, input elements 210, output elements 212, a power source connection 214, and an NFC subsystem 216. The computer readable medium 208 can comprise one or more modules including the communication module 208A.

The memory 202 can be used to store data and code. For example, the memory 202 can store interaction data, APDU commands, etc. The memory 202 may be coupled to the processor 204 internally or externally (e.g., cloud based data storage), and may comprise any combination of volatile and/or non-volatile memory, such as RAM, DRAM, ROM, flash, or any other suitable memory device.

The input elements 210 may include any suitable device(s) capable of inputting data into the user device 102. Examples of input elements 210 include buttons, touch-screens, touch pads, microphones, etc.

The output elements 212 may comprise any suitable device(s) that may output data. Examples of output elements 212 may include display screens, speakers, and data transmission devices. For example, the output elements 212 can include a display screen capable of displaying a response value to a user of the user device 102.

The computer readable medium 208 may comprise code, executable by the processor 204, for performing various methods including methods for allowing the user device 102 to communicate with the previously described portable device.

The communication module 208A allows the processor 204 to control the NFC subsystem 216, which includes the NFC chip 216A and the NFC antenna 216B, which is typically tuned for 13.56 MHz. The NFC chip 216A could be, for example, a PN531 microcontroller-based transmission module from the Phillips Semiconductor Branch of Koninklijke Phillips Electronics N.V.

The network interface 206 may include an interface that can allow the user device 102 to communicate with external computers. Some examples of the network interface 206 may include a modem, a physical network interface (such as an Ethernet card or other Network Interface Card (NIC)), a virtual network interface, a communications port, a Personal Computer Memory Card International Association (PCM-CIA) slot and card, or the like. The wireless protocols enabled by the network interface 206 may include Wi-Fi™. Data transferred via the network interface 206 may be in the form of signals which may be electrical, electromagnetic, optical, or any other signal capable of being received by the external communications interface (collectively referred to as "electronic signals" or "electronic messages"). These electronic messages that may comprise data or instructions may be provided between the network interface 206 and other devices via a communications path or channel. As noted above, any suitable communication path or channel may be used such as, for instance, a wire or cable, fiber optics, a telephone line, a cellular link, a radio frequency (RF) link, a WAN or LAN network, the Internet, or any other suitable medium.

The NFC subsystem 216 can include an NFC chip 216A and an NFC antenna 216B. The communication module 208A, in conjunction with the processor 204, can cooperate with the NFC subsystem 216 to communicate using NFC.

The NFC antenna 216B can include an antenna configured to utilize near-field communication frequencies. Near-field communication can include a set of communication protocols that enable communication between two electronic devices over a distance of 4 cm or less. Near-field communication is based on inductive coupling between two antennas present on near-field communication-enabled devices communicating in one or both directions, using a frequency of 13.56 MHz in the globally available unlicensed radio frequency ISM band using the ISO/IEC 14443 air interface standard at data rates ranging from 106 to 848 kbit/s.

The NFC antenna 216B can be connected to an interface and connected to driver circuits. The interface and the driver circuits can connect the near-field communication antenna 216B to the processor 204.

The power source connection 214 can both provide power and receive power from connected devices. In some embodiments, the power source connection 214 can be electrically coupled to the power supply cable 108, which can be electrically coupled to the bridge apparatus 104. As such the power source connection 214 can provide electricity to the bridge apparatus 104.

Figure 3:
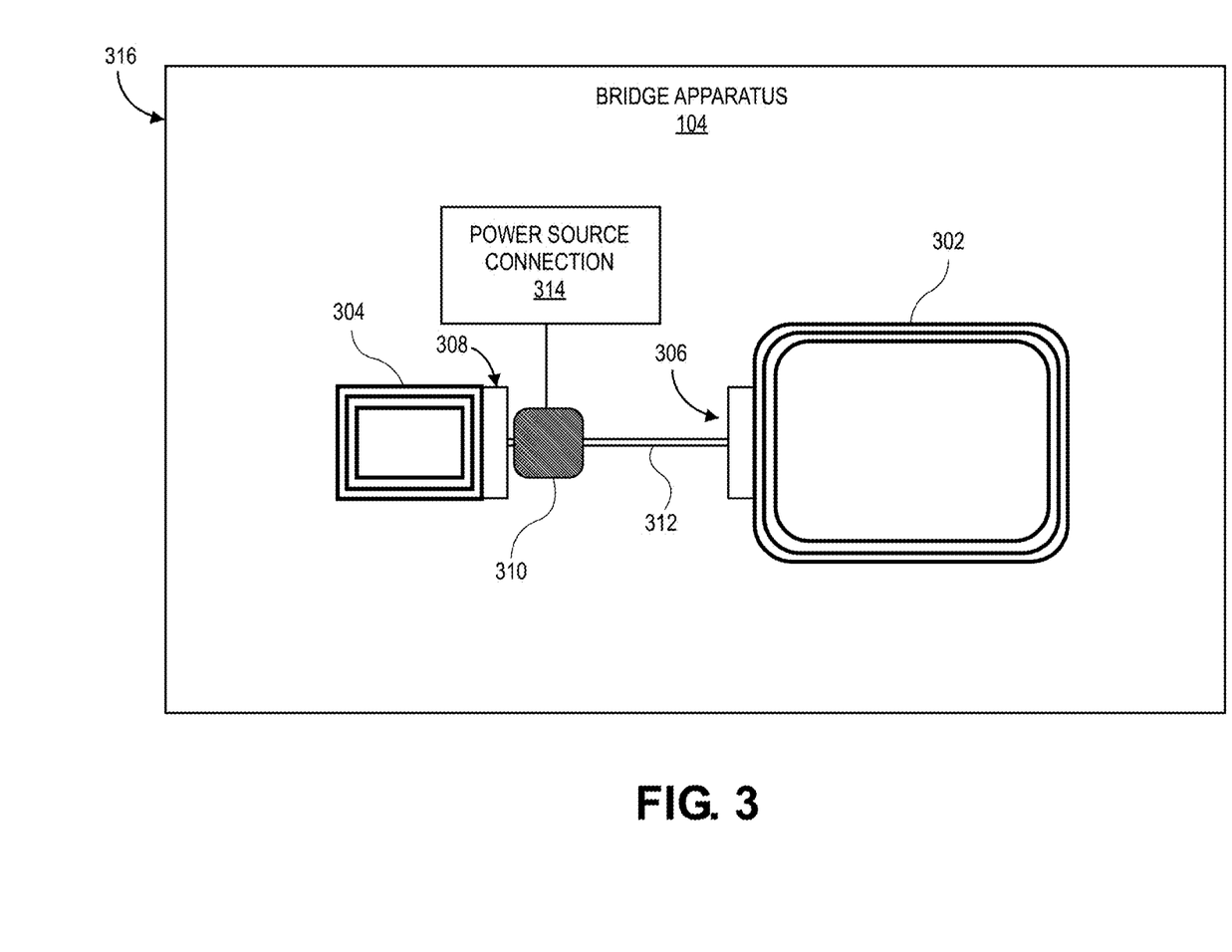
FIG. 3 shows a diagram of components of a bridge apparatus according to embodiments.

FIG. 3 shows a diagram of a bridge apparatus 104 according to embodiments. The exemplary bridge apparatus 104 may comprise a large coil 302, a small coil 304, a first antenna driver circuit 306, and a second antenna driver circuit 308. The large coil 302 can be electrically coupled to the first antenna driver circuit 306. The small coil 304 can be electrically coupled to the second antenna driver circuit 308. The bridge apparatus 104 can also comprise an amplifier circuit 310 electrically coupling the first antenna driver circuit 306 and the second antenna driver circuit 308 with an extender cable or conductor 312. The bridge apparatus 104 also comprises a power source connection 314 that is electrically coupled to the amplifier circuit 310. The bridge apparatus 104 can include a flexible or rigid substrate 316 in which the aforementioned electrical components may be integrated partially or fully.

The first antenna driver circuit 306 can drive the large coil 302. The second antenna driver circuit 308 can drive the small coil 304. In some embodiments, the second antenna driver circuit 308, which drives the small coil 304, can be in an always active mode (when powered via the power source connection 314) and can detect external signals.

The amplifier circuit 310 can amplify signals (e.g., electrical signals) received from the small coil 304 via the second antenna driver circuit 308. The amplifier circuit 310 can amplify the signal using power received from the power source connection 314. The amplifier circuit 310 can be a radio frequency amplifier circuit, and can convert low-power radio frequency signals to higher-power signals. The higher-power signals can be electrically provided to the first antenna driver circuit 306 via the extender cable or conductor 312.

The extender conductor 312 can be capable of carrying electrical signals between the amplifier circuit 310 and the first antenna driver circuit 306. The extender conductor 312 can allow for the bridge apparatus to extend beyond the bounds of the user device 102, as described herein, such that the large coil 302 can be accessible by the portable device 106. The extender conductor 312 can be approximately 1-6 inches in length in some embodiments, and can be in the form of a cable or a printed circuit.

The power source connection 314 can supply power to the amplifier circuit 310. In some embodiments, the power source connection 314 can be electrically coupled to the power supply cable 108 (of FIG. 1). The power supply cable 108 can be electrically coupled to the user device 102 via a power supply port (e.g., USB or USB-C port, a lightening connector port, etc.) in the user device. The battery in the user device can then supply power to the power source connection 314 and the amplifier circuit 310 via the power supply cable 108.

In some embodiments, the power source can be an external power source that can supply power to both the user device 102 and the portable device 106 at the same time.

Figure 4:
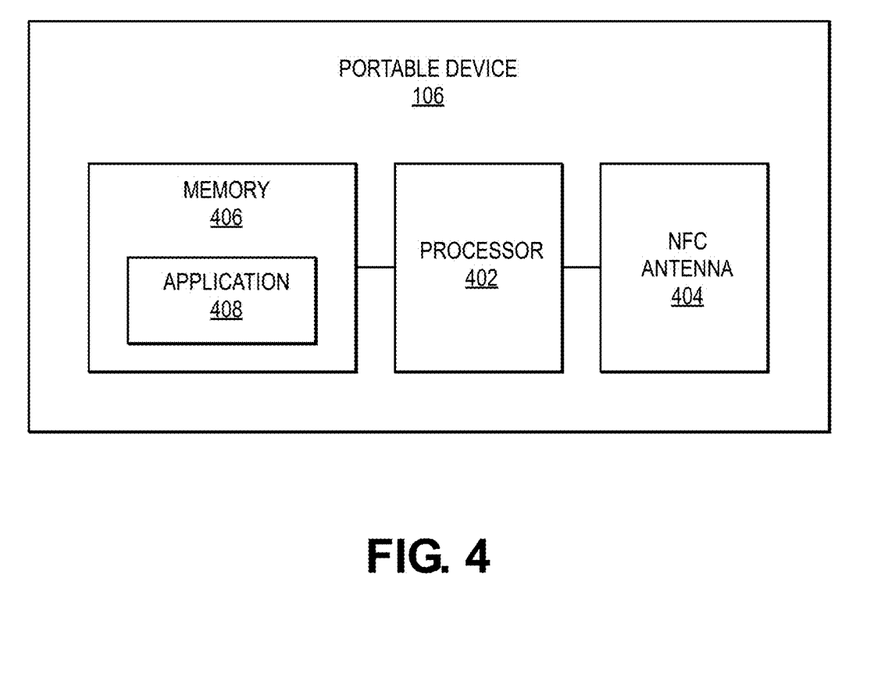
FIG. 4 shows a block diagram of components of a portable device according to embodiments.

FIG. 4 illustrates a block diagram of an exemplary portable device 106. In some embodiments, the portable device 106 can be an integrated circuit chip card. The portable device 106 may include a processor 402, an NFC antenna 404, and a memory 406 storing a plurality of applications (e.g., application 408) executable by the processor 402.

The memory 406 can be implemented using any combination of any number of non-volatile memories (e.g., flash memory, EEPROM) and volatile memories (e.g., DRAM, SRAM), or other suitable non-transitory storage medium, or a combination thereof media. The memory 406 may store various applications, including the application 408, that can be selected by a client device (e.g., the user device 102) for data exchange. Examples of such applications may include mobile wallet applications, interaction applications, resource provider applications, identification applications, etc. An interaction application can include transit applications, secure location access applications, payment applications, and/or any other suitable application facilitating in an interaction between two entities (e.g., a user and a resource provider). In some embodiments, an interaction application can be provisioned by an authorizing entity. As an example, the application 408 can be a payment application that can allow a user of the portable device 106 to gain access to a resource (e.g., goods and/or services purchased using the payment application). The memory 406 may also store credentials such as primary account numbers, tokens, cryptograms, expiration dates, etc.

The NFC antenna 404 can be similar to the NFC antenna 216B in the user device in FIG. 2, and can similarly be included in an NFC subsystem.

Figure 5:
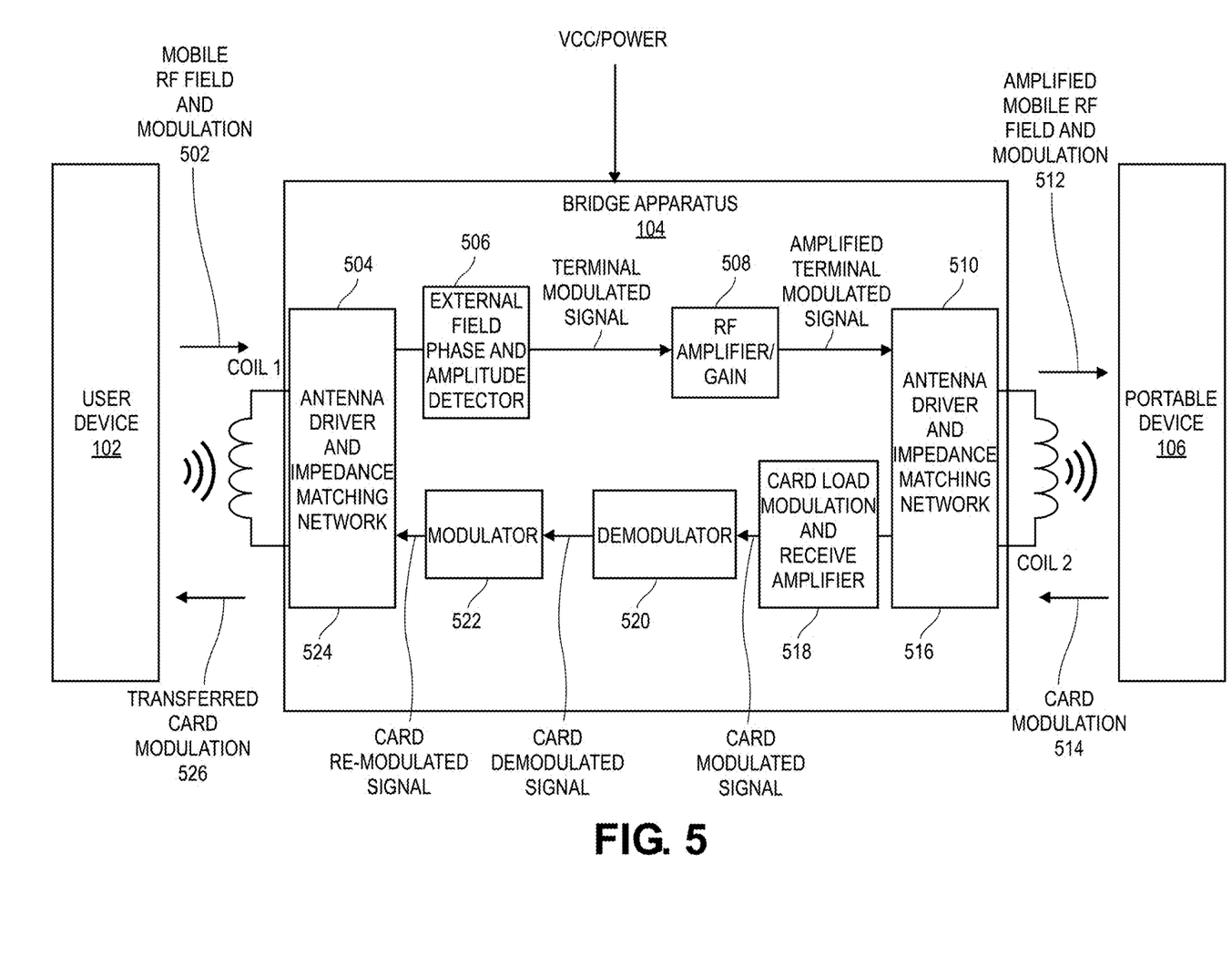
FIG. 5 shows a circuit diagram and a data flow according to embodiments.

FIG. 5 shows a circuit diagram, and a near field communication method according to embodiments. The method illustrated in FIG. 5 will be described in the context of a first user of the user device 102 being a resource provider that is offering resources to a second user of the portable device 106. The signal provided from the user device 102 to the portable device 106 will be described in reference to the signal being formed from a polling message. However, it is understood that any message can be provided from the user device 102 to the portable device 106.

Prior to step 502, the user of the user device 102 can mount and/or connect the bridge apparatus 104 to the user device 102. The bridge apparatus 104 can include a first NFC antenna (e.g., a small coil or "coil 1") and a second NFC antenna (e.g., a large coil or "coil 2"). The first NFC antenna can be situated, while the bridge apparatus 104 is mounted to the user device 102, proximate to an NFC antenna in the user device 102.

The second NFC antenna can extend beyond the bounds of the user device 102, when looking at the screen of the user device 102. The second NFC antenna can be accessible by the portable device 106. Further, the bridge apparatus 104 can be electrically coupled to the user device 102 for power transfer to the bridge apparatus 104 with the power supply cable 108.

The resource provider can initiate an interaction (e.g., a transaction) using an interaction application on the user device 102. The interaction can be for the transfer of the resource from the resource provider to the second user of the portable device 106. After initiating the interaction, the user device 102 can begin a polling process to detect the portable device 106. In some embodiments, the user device 102 can generate the polling message, encode the polling message to obtain an encoded signal, and then modulate the encoded signal to form a modulated polling signal to detect the portable device 106. For example, the user device 102 can provide the polling message as digital data to a signal encoder. The signal encoder can apply a modified Miller coding and/or Manchester coding to the digital data in accordance with the NFC standards. Whether Miller or Manchester coding is applied may depend in part upon the data transfer rate. The encoded output signal can then be modulated onto a radio frequency (RF) carrier signal of 13.56 MHz by a modulator using amplitude shift keying (ASK). ASK is a form of amplitude modulation that represents digital data as variations in the amplitude of the carrier wave.

At some point in time, the second user can bring the portable device 106 into communication range of the second NFC antenna of the bridge apparatus 104.

At step 502, the user device 102 can transmit the modulated polling signal (an example of a first NFC signal) using the NFC antenna in the user device 102 to the first NFC antenna in the bridge apparatus 104. This NFC antenna transmission can occur through magnetic induction. For example, the user device 102 can provide current to the user device NFC antenna. This induces a magnetic field, which further (via mutual coupling) induces an electric current in the first NFC antenna in the bridge apparatus 104.

More specifically, in some embodiments, the signal output from the modulator is passed through an impedance matching circuit in the user device 102, and applied to the terminals of the NFC antenna for transmission. The impedance matching circuit can improve power transfer as is known in the art. Application of the modulated 13.56 MHZ carrier signal to the NFC antenna coil causes the coil to produce a corresponding magnetic field.

At step 504, the first NFC antenna can receive the NFC transmission (e.g., the modulated polling signal) from the user device 102 and can provide the received signal through an antenna driver and impedance matching network. NFC transmission antennas can be impedance matched to 35-50 Ohms.

At step 506, after performing impedance matching, an external field phase and amplitude detector can detect that a near field communication signal has been received.

At step 508, after detecting the modulated polling signal, an RF amplifier/gain component of the bridge apparatus 104 can amplify the modulated polling signal. The RF amplifier/gain component can amplify the modulated polling signal using an external power supply (Vcc).

At step 510, the amplified modulated polling signal is passed to a second antenna driver and impedance matching network of the second NFC antenna.

At step 512, the second antenna driver and impedance matching network can transmit the amplified modulated polling signal to the portable device 106.

The portable device 106 can receive the amplified modulated polling signal using an NFC antenna that is electrically coupled to an antenna driver and impedance matching network. In a non-active NFC transceiver (e.g., such as a non-powered NFC antenna in a portable device 106), the impedance can be matched to an open circuit (or very high impedance, such as 2 kOhms). By doing this, the induced voltage at the NFC chipset is maximized, since very little current may be required to power a processor of the portable device 106 (e.g., <1 mA).

The portable device 106 can process the amplified modulated polling signal. For example, the portable device 106 can demodulate the amplified modulated polling signal to obtain an encoded signal. The portable device can decode the encoded signal to obtain the polling message.

The portable device 106 can generate a response message in response to the polling message. The portable device 106 can encode the response signal (e.g., converts from a digital signal to an encoded signal) and can then modulate the encoded response signal to form a modulated response signal (e.g., converts from an encoded signal to a modulated signal).

At step 514, after generating the modulated response signal, the portable device 106 can transmit the modulated response signal (an example of a second NFC signal) using an NFC antenna to the second NFC antenna of the bridge apparatus 104.

At step 516, the second antenna driver and impedance matching network that is electrically coupled to the second NFC antenna can receive the modulated response signal and perform impedance matching.

At step 518, after the modulated response signal is passed to a receive amplifier, the receive amplifier can amplify the electrical signal.

In some embodiments, at steps 520 and 522, the bridge apparatus 104 can demodulate and modulate the modulated response signal. The bridge apparatus 104 can perform the demodulation and modulation to manage an internal pull up resistor for the driver circuit on the coil of the first NFC antenna. In other embodiments, this is not required and the modulated response signal can be fed directly to the antenna driver circuit at coil 1. In some cases, the signal can be demodulated and modulated to amplify a passive signal on the coil of the first NFC antenna with increased strength (e.g., depth).

At step 520, the bridge apparatus 104 can demodulate the modulated response signal. For example, the demodulator can extract an encoded response signal from the ASK modulated RF carrier of the modulated response signal.

At step 522, the bridge apparatus 104 can modulate the encoded response signal to form a modulated response signal (e.g., a remodulated response signal).

At step 524, after obtaining the modulated response signal, the modulated response signal is passed to the first antenna driver and impedance matching network for transmission of the modulated response signal to the user device 102. The first antenna driver and impedance matching network match impedance with the NFC antenna of the user device 102 during signal transmission.

At step 526, the first NFC antenna of the bridge apparatus 104 can transmit the modulated response signal to the NFC antenna of the user device 102.

After receiving the modulated response signal, the user device 102 can demodulate the modulated response signal to extract an encoded response signal from the ASK modulated RF carrier. The user device 102 can convert the encoded signal into a digital signal of the response, which can be read by the processor of the user device 102. The user device 102 can perform any suitable functionality upon receiving the response from the portable device 106. After polling for the portable device 106 and receiving a response, the user device 102 can generate and transmit commands and/or other messages to the portable device 106 via the bridge apparatus 104. For example, the user device 102 can generate and provide application data unit (APDU) commands to the portable device 106 and receive responses using to the same processes as in FIG. 5 and as described above to continue and complete the interaction.

Figure 6:
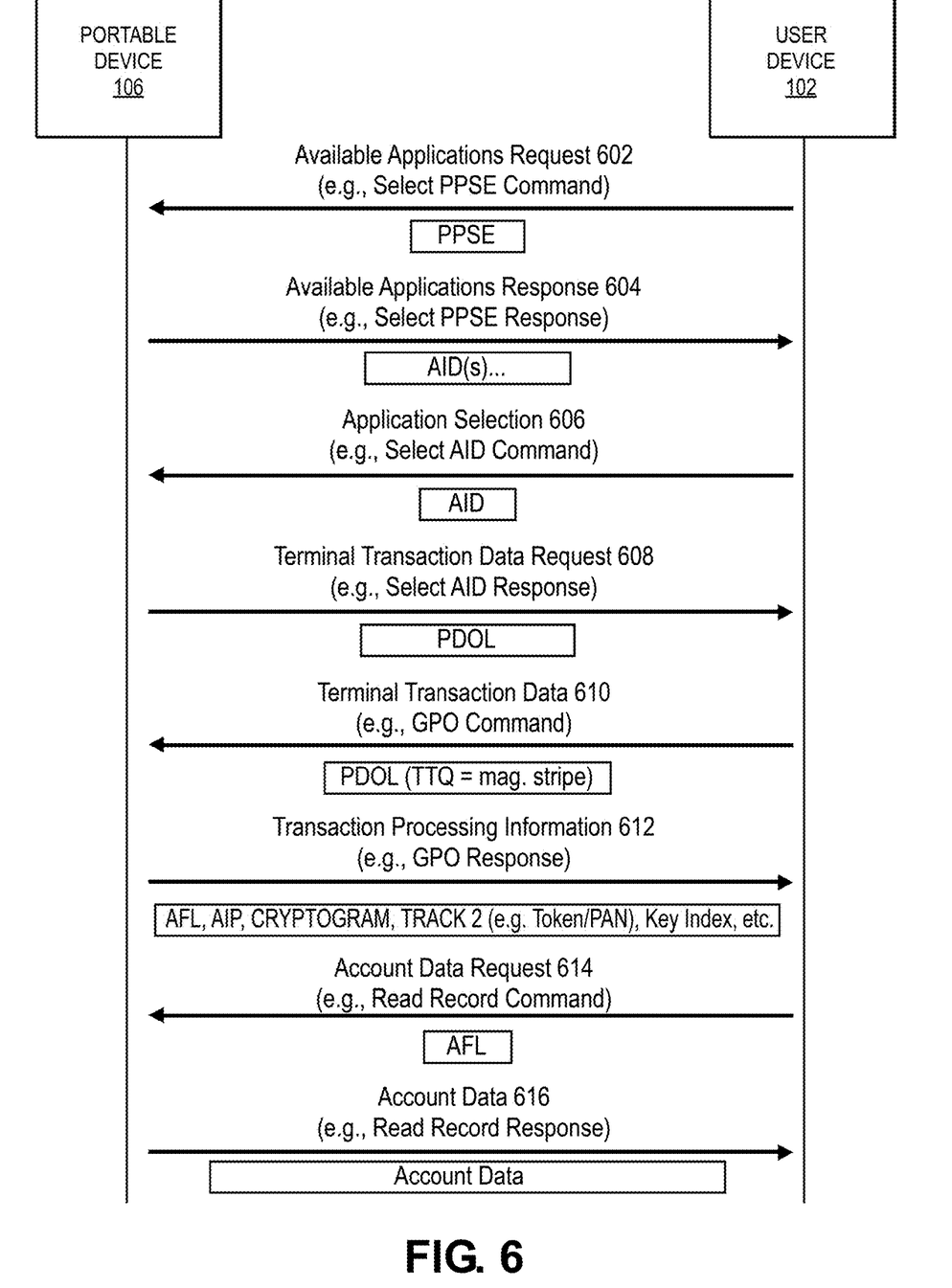
FIG. 6 shows a message exchange process between a user device and a portable device in embodiments.

FIG. 6 shows a flow diagram of the message exchange process between a portable device 106 and a user device 102, while using the above-described bridge device (not shown in FIG. 6). Other message exchange processes may be used in other contexts. In one exemplary embodiment, the portable device 106 is a contactless payment card and the user device 102 is a mobile phone. As explained above, the user may present their portable device 106 to the bridge apparatus, which may communicate with the user device 102. When the user device 102 detects the presence of the portable device 106, an application selection module in the user device 102 may initiate a message exchange process by sending an available application request 602 to the portable device 106. In some embodiments, the available applications request 602 may be in the form of a "select proximity payment system environment (PPSE)" command. In such embodiments, the request for available applications may include a payment environment identifier (e.g., a PPSE name such as "2PAY.SYS.DDF01") to identify the payment environment supported by the user device 102.

Upon receiving the available applications request 602, the portable device 106 may identify and process the request by recognizing the payment environment identifier (e.g., PPSE name) included in the request, and respond by sending an available applications response 604 back to the user device 102. The available applications response 604 may include a list of available account application identifiers (AIDs), application configuration options associated with the available AIDs, and may include the proximity payment environment identifier (e.g., PPSE name) as the dedicated file name.

Also, in some embodiments, such as the case where the portable device 106 may be a mobile communication device, the available applications response 604 may include a wallet identifier associated with a mobile application. In some embodiments, the available applications response 604 may be in the form of a "select PPSE" response and may include PPSE file control information (FCI). For example, the available applications response 604 may include a directory entry for each available AID on the contactless portable device 106. In some embodiments, there may be a wallet identifier associated with each available AID. Each directory entry may include information such as the AID, an application label associated with the AID (e.g., a mnemonic associated with the AID such as "Visa Debit"), an application priority indicator indicating the priority of the AID, a kernel identifier indicating the application's kernel preference, and/or additional information relating to the particular AID. The available applications response 604 may also include other data such as FCI issuer discretionary data or any other relevant information.

The user device 102 may determine a supported account application based on the received available AIDs and may send an "application selection" command 606 including the selected AID to the contactless portable device 106.

Additionally, in some embodiments, upon receiving the application selection message 606, the contactless portable device 106 may send a terminal transaction data request 608 to request transaction data from the user device 102 which may be needed complete the provisioning process for the selected application associated with the selected AID. In some embodiments, the terminal transaction data request 608 may be in the form of a "Select AID Response" and may include application identifier (AID) file control information (FCI) with the selected AID as the dedicated file name. The terminal transaction data request may include a list of transaction data identifiers to request the appropriate data from the user device 102, and the list of transaction data identifiers can be in the form of a processing options data object list (PDOL).

The transaction data requested by the contactless portable device 106 for the transaction may include an entity identifier associated with the user device 102, terminal processing options (TPO), an amount, communication device identifier, and other information. In addition, the transaction data may include the dynamic data element (e.g., the random number) previously generated by the processing server computer 105. In other embodiments, the transaction information may be provided as part of the application selection message 606 and/or as part of the available applications request 602.

After receiving the terminal transaction data request 608, the user device 102 may send to the contactless portable device 106 the terminal transaction data 610 requested by the contactless portable device 106. In some embodiments, the terminal transaction data 610 may be sent in the form of a get processing options (GPO) command, and may include the requested terminal transaction data 610 in a processing options data object list (PDOL). In some embodiments, the terminal transaction data 610 (e.g., Transaction Processing Options (TPO)) may include a TPO indicator that indicates which transaction data types the user device 102 supports.

Once the portable device 106 receives the terminal transaction data 610, the portable device 106 obtains relevant card credentials from its contactless element 103B, and may send a set of transaction processing information 612 to the user device 102. In some embodiments, the transaction processing information 612 can be sent in the form of a "get processing options" (GPO) response. In some embodiments, the transaction processing information may include one or more application file locators (AFLs) that can be used as file addresses by user device 102 to read account data stored on the portable device 106, and an application interchange profile (AIP) that can be used to indicate the capabilities of the payment application.

The transaction processing information 612 may include any credentials for the transaction including a cryptogram generated using transaction information, Track-2 equivalent data (e.g., PAN, expiration date), and/or additional data. For example, the cryptogram may be generated using transaction information, which may include at least the previously described dynamic data element (e.g., the random number), the user device identifier (e.g., a PAN), and optionally other information such as a session identifier, a value, and a transaction counter. The transaction processing information 612 may also include issuer application data (IAD), a form factor indicator (FFI), card transaction qualifiers (CTQ), cryptogram information data (CID), and/or an application PAN sequence number (PAN). In some embodiments, the issuer application data (IAD) may include a length indicator indicating the length of the IAD, cryptogram version number (CVN) indicating the version of the transaction cryptogram, a derived key indicator (DKI) that can be used to identify a master key (e.g., a master key associated with the issuer), and/or card verification results (CVR). Further details regarding the cryptogram generation process are described below in reference to FIG. 8.

After the user device 102 receives the transaction processing information 612, the user device 102 may send an account data request 614 to the portable device 106 to read additional account data that may be stored on the portable device 106. In some embodiments, the account data request 614 may be in the form of a "read record" command, and may include an application file locator (AFL) indicating the location of the account data that the user device 102 is attempting to read. The AFL included in the account data request 614 may correspond to an AFL in the transaction processing information 612 that was provided to the user device 102 from portable device 106.

In response to receiving the account data request 614 from the user device 102, the contactless portable device 106 may send the account data 616 stored at the location indicated by the AFL to user device 102. In some embodiments, the account data 616 may be sent in the form of a "read record" response. The account data 616 may include, for example, application usage control that indicates the issuer's restrictions on usage and services allowed for the application, the cardholder's name, customer exclusive data, issuer country code, and/or other account related data that is accessible at the AFL location and is stored in the portable device 106.

Embodiments of the disclosure have a number of advantages. For example, embodiments allow a user to reliably interact their portable device with a user device, using NFC, while the front of the user device faces the user and while the user device has a rear-facing NFC antenna. Embodiments can amplify the NFC signal provided through a bridge apparatus to increase communication range with the portable device and to improve the quality of message exchange between the portable device and the user device.

Any of the software components or functions described in this application may be implemented as software code to be executed by a processor using any suitable computer language such as, for example, Java, C, C++, C#, Objective-C, Swift, or scripting language such as Perl or Python using, for example, conventional or object-oriented techniques. The software code may be stored as a series of instructions or commands on a computer readable medium for storage and/or transmission, suitable media include random access memory (RAM), a read only memory (ROM), a magnetic medium such as a hard-drive or a floppy disk, or an optical medium such as a compact disk (CD) or DVD (digital versatile disk), flash memory, and the like. The computer readable medium may be any combination of such storage or transmission devices.

Such programs may also be encoded and transmitted using carrier signals adapted for transmission via wired, optical, and/or wireless networks conforming to a variety of protocols, including the Internet. As such, a computer readable medium according to an embodiment of the present invention may be created using a data signal encoded with such programs. Computer readable media encoded with the program code may be packaged with a compatible device or provided separately from other devices (e.g., via Internet download). Any such computer readable medium may reside on or within a single computer product (e.g. a hard drive, a CD, or an entire computer system), and may be present on or within different computer products within a system or network. A computer system may include a monitor, printer, or other suitable display for providing any of the results mentioned herein to a user.

The above description is illustrative and is not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

One or more features from any embodiment may be combined with one or more features of any other embodiment without departing from the scope of the invention.

As used herein, the use of "a," "an," or "the" is intended to mean "at least one," unless specifically indicated to the contrary.

What is claimed is:

1. A method of allowing for communication between a portable device comprising a portable device NFC antenna and a user device comprising a user device NFC antenna using a bridge apparatus comprising a large coil, a small coil, and an amplifier circuit electrically coupling the large coil and the small coil, the method comprising:
   receiving, by the small coil in the bridge apparatus from the user device NFC antenna, a first near field communication (NFC) signal;
   amplifying, by the amplifying circuit, the first NFC signal to obtain an amplified NFC signal;
   transmitting, by the large coil in the bridge apparatus to the portable device NFC antenna, the amplified NFC signal;
   receiving, by the large coil in the bridge apparatus from the portable device NFC antenna, a second NFC signal; and
   transmitting, by the small coil to the user device NFC antenna, the second NFC signal.

2. The method of claim 1, wherein the first NFC signal is a modulated polling signal for the user device polling for the portable device, and wherein the second NFC signal is a modulated response signal.

3. The method of claim 1, wherein the user device is a phone and the portable device is a card.

4. A method of allowing for communication between a portable device comprising a portable device NFC antenna and a user device comprising a user device NFC antenna using a bridge apparatus comprising a large coil, a small coil, and an amplifier circuit electrically coupling the large coil and the small coil, wherein the bridge apparatus is positioned behind the user device, such that the small coil overlaps and is proximate to a back surface of the user device, and the large coil does not overlap with the back surface of the user device, the method comprising:
   receiving, by the small coil in the bridge apparatus from the user device NFC antenna, a near field communication (NFC) signal;
   amplifying, by the amplifying circuit, the NFC signal to obtain an amplified NFC signal; and
   transmitting, by the large coil in the bridge apparatus to the portable device NFC antenna, the amplified NFC signal.

5. The method of claim 4, further comprising:
   supplying power from a power source to the amplifier circuit.

6. The method of claim 5, wherein the power source is a battery in the user device.

7. The method of claim 4, wherein the portable device NFC antenna is proximate to the large coil, and wherein the user device NFC antenna is proximate to the small coil.

8. The method of claim 4, wherein the amplifier circuit is a radio frequency amplifier circuit.

9. A system comprising:
   a portable device comprising a portable device NFC antenna;
   a user device comprising a user device NFC antenna; and
   a bridge apparatus configured to allowing communication between the portable device NFC antenna and user device NFC antenna, the bridge apparatus comprising a large coil, a small coil, and an amplifier circuit electrically coupling the large coil and the small coil, wherein the bridge apparatus is positioned behind the user device, such that the small coil overlaps and is proximate to a back surface of the user device, and the large coil does not overlap with the back surface of the user device; and a power source supplying power to the amplifier circuit.

10. The system of claim 9, wherein the power source is in the user device.

11. The system of claim 9, wherein the power source is a battery pack external to the user device and the portable device.

12. The system of claim 9, wherein the portable device NFC antenna is proximate to the large coil, and wherein the user device NFC antenna is proximate to the small coil.

13. A system comprising:
 a portable device comprising a portable device NFC antenna;
 a user device comprising a user device NFC antenna; and
 a bridge apparatus configured to allowing communication between the portable device NFC antenna and user device NFC antenna, the bridge apparatus comprising a large coil, a small coil, and an amplifier circuit electrically coupling the large coil and the small coil, wherein the bridge apparatus further comprises a cover element that covers the large coil and indicates a landing plane for the portable device; and
 a power source supplying power to the amplifier circuit.

14. The system of claim 13, wherein the portable device is credit card or a debit card.

15. The system of claim 13, wherein the small coil has a maximum dimension of about 2.5 inches and wherein the large coil has a maximum dimension of about 5 inches.

16. The system of claim 13, wherein the amplifier circuit is a radio frequency amplifier circuit.

17. The system of claim 13, wherein the power source is a battery.

18. The system of claim 13, wherein the bridge apparatus further comprises a substrate, wherein the large coil, the small coil, the amplifier circuit, and the power source are embedded in the substrate.

* * * * *